United States Patent [19]

Sugino

[11] 4,158,065

[45] Jun. 12, 1979

[54] CRAB MEAT SUBSTITUTE AND METHOD OF PREPARING SAME

[75] Inventor: Yoshito Sugino, Nanao, Japan

[73] Assignee: Sugiyo Co., Ltd., Nanao City, Japan

[21] Appl. No.: 861,217

[22] Filed: Dec. 16, 1977

[51] Int. Cl.$^2$ .................... A22C 25/00; A23L 1/325

[52] U.S. Cl. .................................. 426/104; 426/250; 426/574; 426/643; 426/513; 426/517; 426/518; 426/802

[58] Field of Search ............... 426/104, 250, 574, 643, 426/513, 517, 518, 802

[56] References Cited

U.S. PATENT DOCUMENTS

| | | | |
|---|---|---|---|
| 3,852,487 | 12/1974 | Werven et al. | 426/643 |
| 3,892,866 | 7/1975 | Kanemitsu | 426/643 |
| 3,922,372 | 11/1975 | Hasegawa | 426/643 X |

FOREIGN PATENT DOCUMENTS 2292437 11/1975 France.

*Primary Examiner*—Robert A. Yoncoskie
*Attorney, Agent, or Firm*—Eric P. Schellin

[57] ABSTRACT

A crab meat substitute is prepared by molding mashed and seasoned meat in the presence of heat utilizing the thermally solidifying properties of the meat proteins which have a jelly strength of 300 to 1,500 g. The molded crab meat substitute is shredded into pieces ranging from 0.25 to 3.0 mm in width and up to 2.25 mm$^2$ in cross sectional area to obtain a food similar to crab meat in taste and in texture. When suitably colored red or incorporating a small amount of crab meat or eggs, the meat substitute can be made to more closely resemble crab meat in appearance and taste.

12 Claims, 7 Drawing Figures

A to F represent the following:
- A: Texture resembling a paste of fish meat.
- B: Texture resembling fragments of semi-dry cooked fish meat.
- C: Texture resembling fibers of crab leg meat (good).
- D: Texture resembling fibers of crab leg meat (best).
- E: Texture resembling fibers of crab leg meat (fair).
- F: Texture resembling shreds of "kamaboko".

CRAB MEAT SUBSTITUTE AND METHOD OF PREPARING SAME

BACKGROUND OF THE INVENTION

The present invention is directed to a simulated crab meat similar in taste and texture to crab meat, and, more particularly, to a simulated crab meat prepared from a molded product of mashed fish meat, such as "Kamaboko".

Crab meat, especially the meat from crab legs, has a very good taste, however in recent years it has become very expensive and, even worst, not readily available. It is therefore an object of this invention to provide a simulated food resembling crab meat in taste and in texture.

To the best of my knowledge the present state-of-the-art on methods of preparing artificial foods from vegetable proteins or fish meat is exemplified in the following U.S. patents and Japanese patents and publications:
(1) U.S. Pat. No. 2,387,382
(2) U.S. Pat. No. 3,591,389
(3) U.S. Pat. No. 3,773,523
(4) U.S. Pat. No. 3,829,587
(5) U.S. Pat. No. 3,840,671
(6) Japanese Patent Publication No. 14,909/1972
(7) Japanese Patent Publication No. 22,792/1972
(8) Japanese Patent Application Disclosure No. 88,568/1974.

These patented methods and disclosed methods of preparing artificial foods contemplate the provision of food products having enhanced viscosity, elasticity, or taste similar to cattle meat, but they do not provide a simulated meat which resembles crab meat in taste and texture.

The taste of food is the total blend of sensations consisting not only of sensations produced by stimulating the taste buds of the tongue but also of sensations produced by stimulating the sense of touch and the sense of smell. Thus, it is known that the sense of touch, i.e., the texture of food can be the most important factor of taste. It has been observed that animal muscle consists essentially of muscle fibrils which are bundled into muscle fibers or cells. A large number of muscle fibers are further bundled into a myotome. The mode of bundling muscle fibers and the strength of the bond between muscle fibers vary from animal to animal, consequently leading to differences in the size and firmness of myotomes and, therefore, to differences in texture. Crab meat from either the legs or body, when separated into pieces, is usually separated into thread or fiber-like portions corresponding to the myotomes mentioned above.

In examining the muscle structure of crab meat, the myotomes of crab meat have been tested for strength, cross sectional shape and thickness. As a result of these tests and successful experimentation with fish meat a fibrous simulated crab meat has been invented which has the same characteristics as crab meat.

SUMMARY OF THE INVENTION

This invention is directed to a simulated crab meat similar to crab meat in taste and texture where mashed fish is seasoned and molded in the presence of heat similar to the traditional Japanese food "Kamaboko". "Kamaboko" is prepared by grinding or mashing fish meat, seasoning the mashed meat, placing the seasoned mashed meat in a mold and solidifying the meat with heat utilizing the thermally solidifying properties of the meat proteins. This invention provides a fibrous simulated crab meat by preparing the "Kamaboko" having a specified jelly strength and shredding the "Kamaboko38 into fiber-like pieces having a specified thickness.

BRIEF DESCRIPTION OF THE DRAWINGS

This invention will be described below in greater detail with reference to the accompanying drawings, in which.

DETAILED DESCRIPTION OF THE INVENTION

Figure 1:
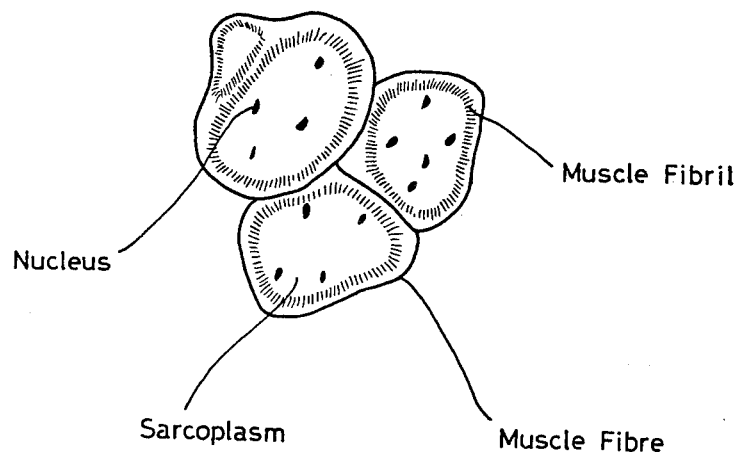
FIG. 1 is a schematic view showing the structure of animal muscle.

When microscopically observed as shown in FIG. 1, animal muscle consists essentially of muscle fibrils, 0.01 to 0.1 mm in length and 1 to 2$\mu$ in diameter, which are bundled into muscle fibers or muscle cells of 0.01 to 0.1 mm in length and 50 to 100$\mu$ in diameter. As stated above a large number of muscle fibers are further bundled into a myotome. The mode of bundling muscle fibers and the strength of bond between muscle fibers vary from animal to animal, consequently leading to differences in the size and firmness of myotomes and therefore to differences in texture. Crab meat from either the legs or body when separated into pieces, is usually separated into thread or fiber-like portions corresponding to the myotomes mentioned above.

Figure 2:
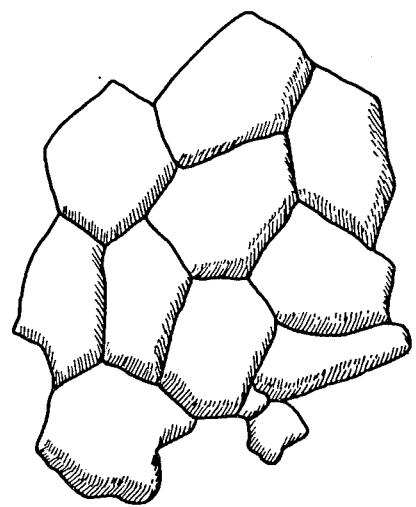
FIG. 2 is a schematic view showing myotomes of crab meat (*Chionecetes opilio*) in cross section.

Myotomes of crab (*Chionecetes opilio*) have been observed with the following results:
(1) The myotomes, although randomly shaped as seen in FIG. 2, are generally almost rectangular in cross section.
(2) The myotomes of the leg meat have varying cross sections such as approximate squares generally of 0.5 mm×0.5 mm, 1.0 mm×1.0 mm and 1.5 mm×1.5 mm and approximate rectangles generally of 0.5 mm×1.0 mm, 0.5 mm×0.5 mm and 1.0 mm×1.5 mm, a majority thereof being of the order of 0.5 mm×1.5 mm.
(3) The myotomes of the body meat are of sizes ranging from 0.3 mm×0.5 mm to 0.2 mm×0.4 mm.
(4) The myotomes are joined together very loosely and are therefore readily separable into pieces.

(5) The myotomes have jelly strengths of 300 to 1,500 g.

Specimens of "Kamaboko" having varying jelly strengths were shredded into fiber-like pieces of substantially square cross section, and the shredded pieces were subjected to sensory test to determine the texture. The results are given in FIG. 3 which indicate that fiber-like pieces of "Kamaboko" have textures resembling those of crab leg meat and crab body meat when they have a jelly strength of 300 to 1,500 g and a shredding width of 0.25 to 1.5 mm. The test results further reveal that the optimum shredding width (the shredding width that provides the best crab meat resembling texture) and the upper limit of the shredding width (the largest width that affords a crab meat resembling texture) alter with the jelly strength.

Shown below are the details of the relationship between the shredding width and the texture of shredded pieces of "Kamaboko" specimens having a jelly strength of 1,050 g and 340 g.

Table 1

| Shredding width (mm) | Texture Jelly strength: 1,050 g | Jelly strength: 340 g |
|---|---|---|
| Less than 0.25 | Like fragments of semi-dry cooked fish meat | Like paste of fish meat |
| 0.25 to less than 0.5 | Like myotomes of crab body meat | Like fragments of semi-dry cooked fish meat |
| 0.5 | Like myotomes of crab leg meat (good) | Like myotomes of crab body meat |
| 1.0 | Same as above (best) | Like myotomes of crab leg meat (good) |
| 1.5 | Same as above (fair) | No texture resembling myotomes of crab leg meat |
| More than | Like shreds of "Kamaboko" (also in appearance) | Like fine noodles (also in appearance) |

In the table above, the shredding width, for example, of 1.5 mm refers to the width of pieces obtained by shredding the "Kamaboko" into 1.5 mm thick shreds and further shredding the shreds to a thickness of 1.5 mm, the pieces therefore have a cross section of approximately 1.5 mm × 1.5 mm.

Figure 3:
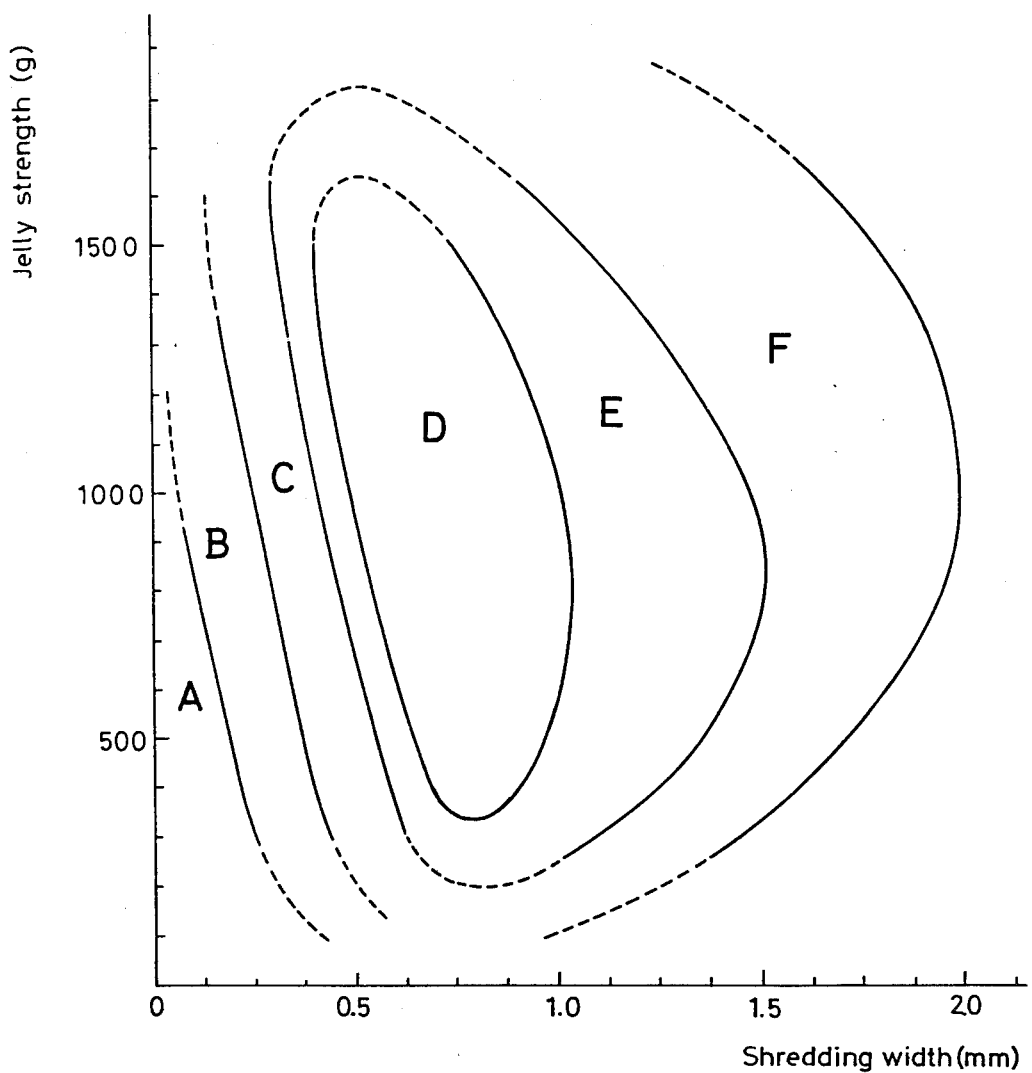
FIG. 3 is a diagram showing the relationship between the jelly strength, shredding width and crab meat resembling texture of shredded pieces prepared from moldings of mashed fish meat, the pieces having substantially the same primary and secondary shredding widths.

The table shows that with the "Kamaboko" having a jelly strength of 1,050 g the effective shredding width, namely, the shredding width giving a crab meat resembling texture, is in the range of 0.25 to 1.5 mm, and that the effective shredding width of the "Kamaboko" with a jelly strength of 340 g ranges from 0.5 to 1.0 mm. FIG. 3 and Table 1 reveal that the range of jelly strengths and that of shredding widths are correlated to each other in giving crab meat resembling textures. The range of effective shredding widths is narrow at very low jelly strengths and at very high jelly strengths. It is further seen that at jelly strengths of the order of 1,000 g, the optimum condition for giving the best crab meat resembling texture is 1.0 mm × 1.0 mm, the upper limit being 1.5 mm × 1.5 mm.

However, subsequent research revealed that if shredded pieces of "Kamaboko" are prepared in the same manner as above with a cross sectional area where the product has upper limits of shredding widths which resembles a crab meat texture as stated above (e.g. 1.5 mm × 1.5 mm = 2.25 mm$^2$ at jelly strengths of about 1,000 g), a crab meat resembling texture is still obtainable even when the length of one edge of the cross section is well above the foregoing range. This will be described below.

As already described, a majority of the myotomes of leg meat of *Chionecetes opilio* have cross sections approximate to 0.5 mm × 1.5 mm. Shredded "Kamaboko" pieces, 1.5 mm × 1.5 mm, 1.0 mm × 1.0 mm and 0.5 mm × 1.5 mm in cross sections, were prepared and evaluated for texture. It was found that the 0.5 mm × 1.5 mm pieces are superior to the 1.5 mm × 1.5 mm pieces and similar to the 1.0 mm × 1.0 mm pieces in crab meat resembling texture. This appears to indicate that the shredded pieces will retain a crab meat resembling texture if one edge of the cross section thereof has a short length notwithstanding that the other edge has a fairly increased length.

It is further noted that myotomes of leg meat of some kinds of crabs, like those of *Paralithodes camtschaticus*, are larger than the myotomes of *Chionecetes opilio*. Accordingly, several kinds of shredded pieces of "Kamaboko" specimens having varying shredding widths at varying jelly strengths were prepared and subjected to sensory test in order to further explore the relationship between the cross sectional shape and size of the shredded pieces and their resemblance in texture to crab meat. The results are given in Tables 2 to 5 below and in FIG. 4.

Table 2

| Jelly strength: 350 g | | | | | | | | |
|---|---|---|---|---|---|---|---|---|
| 0.25 × 0.25 | 0.25 × 0.5 | 0.25 × 1.0 | 0.25 × 1.5 | 0.25 × 2.0 | 0.25 × 2.5 | 0.25 × 3.0 | 0.25 × 3.5 | 0.25 × 4.0 |
| 0.5 × 0.25 | 0.5 × 0.5 | 0.5 × 1.0 | 0.5 × 1.5 | 0.5 × 2.0 | 0.5 × 2.5 | 0.5 × 3.0 | 0.5 × 3.5 | 0.5 × 4.0 |
| 1.0 × 0.25 | 1.0 × 0.5 | 1.0 × 1.0 | 1.0 × 1.5 | 1.0 × 2.0 | 1.0 × 2.5 | 1.0 × 3.0 | 1.0 × 3.5 | 1.0 × 4.0 |
| 1.5 × 0.25 | 1.5 × 0.5 | 1.5 × 1.0 | 1.5 × 1.5 | 1.5 × 2.0 | 1.5 × 2.5 | 1.5 × 3.0 | 1.5 × 3.5 | 1.5 × 4.0 |
| 2.0 × 0.25 | 2.0 × 0.5 | 2.0 × 1.0 | 2.0 × 1.5 | 2.0 × 2.0 | 2.0 × 2.5 | 2.0 × 3.0 | 2.0 × 3.5 | 2.0 × 4.0 |
| 2.5 × 0.25 | 2.5 × 0.5 | 2.5 × 1.0 | 2.5 × 1.5 | 2.5 × 2.0 | 2.5 × 2.5 | | | |
| 3.0 × 0.25 | 3.0 × 0.5 | 3.0 × 1.0 | 3.0 × 1.5 | | | | | |

Table 3

Jelly strength: 950 g

| | | | | | | | | |
|---|---|---|---|---|---|---|---|---|
| 0.25 | 0.25 | 0.25 | 0.25 | 0.25 | 0.25 | 0.25 | 0.25 | 0.25 |
| × | × | × | × | × | × | × | × | × |
| 0.25 | 0.5 | 1.0 | 1.5 | 2.0 | 2.5 | 3.0 | 3.5 | 4.0 |
| 0.5 | 0.5 | 0.5 | 0.5 | 0.5 | 0.5 | 0.5 | 0.5 | 0.5 |
| × | × | × | × | × | × | × | × | × |
| 0.25 | 0.5 | 1.0 | 1.5 | 2.0 | 2.5 | 3.0 | 3.5 | 4.0 |
| 1.0 | 1.0 | 1.0 | 1.0 | 1.0 | 1.0 | 1.0 | 1.0 | 1.0 |
| × | × | × | × | × | × | × | × | × |
| 0.25 | 0.5 | 1.0 | 1.5 | 2.0 | 2.5 | 3.0 | 3.5 | 4.0 |
| 1.5 | 1.5 | 1.5 | 1.5 | 1.5 | 1.5 | 1.5 | 1.5 | 1.5 |
| × | × | × | × | × | × | × | × | × |
| 0.25 | 0.5 | 1.0 | 1.5 | 2.0 | 2.5 | 3.0 | 3.5 | 4.0 |
| 2.0 | 2.0 | 2.0 | 2.0 | 2.0 | 2.0 | 2.0 | | |
| × | × | × | × | × | × | × | | |
| 0.25 | 0.5 | 1.0 | 1.5 | 2.0 | 2.5 | 3.0 | | |
| 2.5 | 2.5 | 2.5 | 2.5 | 2.5 | | | | |
| × | × | × | × | × | | | | |
| 0.25 | 0.5 | 1.0 | 1.5 | 2.0 | | | | |
| 3.0 | 3.0 | 3.0 | 3.0 | | | | | |
| × | × | × | × | | | | | |
| 0.25 | 0.5 | 1.0 | 1.5 | | | | | |

Table 4

Jelly strength: 1500 g

| | | | | | | | |
|---|---|---|---|---|---|---|---|
| 0.25 | 0.25 | 0.25 | 0.25 | 0.25 | 0.25 | 0.25 | 0.25 |
| × | × | × | × | × | × | × | × |
| 0.25 | 0.5 | 1.0 | 1.5 | 2.0 | 2.5 | 3.0 | 3.5 |
| 0.5 | 0.5 | 0.5 | 0.5 | 0.5 | 0.5 | 0.5 | |
| × | × | × | × | × | × | × | |
| 0.25 | 0.5 | 1.0 | 1.5 | 2.0 | 2.5 | 3.0 | |
| 1.0 | 1.0 | 1.0 | 1.0 | 1.0 | | | |
| × | × | × | × | × | | | |
| 0.25 | 0.5 | 1.0 | 1.5 | 2.0 | | | |
| 1.5 | 1.5 | 1.5 | | | | | |
| × | × | × | | | | | |
| 0.25 | 0.5 | 1.0 | | | | | |
| 2.0 | 2.0 | 2.0 | | | | | |
| × | × | × | | | | | |
| 0.25 | 0.5 | 1.0 | | | | | |
| 2.5 | 2.5 | 2.5 | | | | | |
| × | × | × | | | | | |
| 0.25 | 0.5 | 1.0 | | | | | |
| 3.0 | 3.0 | 3.0 | | | | | |
| × | × | × | | | | | |
| 0.25 | 0.5 | 1.0 | | | | | |

Table 5

Range of shredding widths, giving a crab leg meat resembling texture, common to Tables 2–4

| | | | | | | |
|---|---|---|---|---|---|---|
| 0.25 | 0.25 | 0.25 | 0.25 | 0.25 | 0.25 | 0.25 |
| × | × | × | × | × | × | × |
| 0.25 | 0.5 | 1.0 | 1.5 | 2.0 | 2.5 | 3.0 |
| 0.5 | 0.5 | 0.5 | 0.5 | 0.5 | 0.5 | 0.5 |
| × | × | × | × | × | × | × |
| 0.25 | 0.5 | 1.0 | 1.5 | 2.0 | 2.5 | 3.0 |
| 1.0 | 1.0 | 1.0 | 1.0 | 1.0 | | |
| × | × | × | × | × | | |
| 0.25 | 0.5 | 1.0 | 1.5 | 2.0 | | |
| 1.5 | 1.5 | 1.5 | 1.5 | 1.5 | | |
| × | × | × | × | × | | |
| 0.25 | 0.5 | 1.0 | 1.5 | 2.0 | | |
| 2.0 | 2.0 | 2.0 | 2.0 | | | |
| × | × | × | × | | | |
| 0.25 | 0.5 | 1.0 | 1.5 | | | |
| 2.5 | 2.5 | 2.5 | 2.5 | | | |
| × | × | × | × | | | |
| 0.25 | 0.5 | 1.0 | 1.5 | | | |
| 3.0 | 3.0 | 3.0 | 3.0 | | | |
| × | × | × | × | | | |
| 0.25 | 0.5 | 1.0 | 1.5 | | | |

Figure 4:
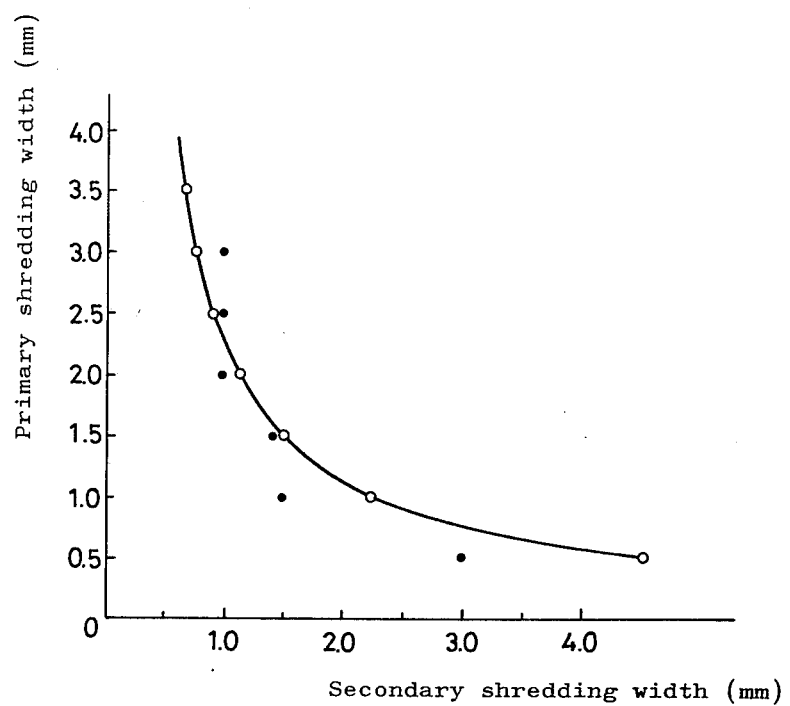
FIG. 4 is a diagram showing the widths in which a molded product of mashed fish meat is shredded into fiber-like pieces and which gives a cross sectional area of 1.25 cm$^2$, the diagram further shows the actual limits of the widths affording crab meat resembling textures in the case where the fish meat product has a jelly strength of 950 g.

Table 2 shows the results obtained at a jelly strength of 350 g, Table 3 shows the results at a jelly strength of 950 g and Table 4 shows the results at a jelly strength of 1,500 g. The upper number in each square of each table indicates the primary shredding width to which the "Kamaboko" was shredded first, and the lower number the secondary shredding width in which the resulting shreds were further shredded to fiber-like pieces. The numerical values are in millimeters. For example, the indication of 0.5×1.5 shows that the specimen was first shredded to a width of 1.5 mm. The center area of each table surrounded by a heavy line represents shredded pieces similar to crab meat in appearance and texture, and the remaining area represents dissimilar pieces. Table 5 shows an area surrounded by a hatched heavy line representing the pieces resembling crab leg meat in the dimensional range common to Tables 2 to 4. The graph of FIG. 4 shows the relationship between the cross sectional area of shredded pieces of "Kamaboko" and the texture resembling the crab leg meat in the case of a jelly strength of 950 g, namely, of Table 3. The primary shredding width is plotted as the ordinate and the secondary shredding width is plotted as the abscissa. The mark "." represents a numerical value on the left side of and immediately adjacent to the heavy line on the right-hand side of Table 3, namely a limit below which the "Kamaboko" pieces actually have a crab meat resembling texture. The mark " " represents the cross sectional dimensions of "Kamaboko" pieces having the cross sectional area of 2.25 mm² which is the product of the upper limits of shredding widths giving a crab meat resembling texture.

First, the results achieved at a jelly strength of 950 g will be discussed. Table 3 and FIG. 4 reveal that a majority of the "Kamaboko" pieces having a close resemblance to crab leg meat in appearance and texture have a cross sectional area of up to 2.25 mm² and that the 3.0 mm×1.0 mm and 2.5 mm×1.0 mm pieces alone have a larger cross sectional area. This indicates that the resemblance of shredded "Kamaboko" pieces to crab leg meat is dependent heavily on the cross sectional area as well as on the shredding width.

Further, as will be apparent from Table 3, it is critical that the shredding width per se be within the range of 0.25 mm to 3.0 mm. With widths outside this range, a crab leg meat resembling texture is not obtainable even if the cross sectional area is below the aforementioned specific value.

It is suitable that the shredded "Kamaboko" have a length of 3 to 8 cm. However, lengths outside this range will not substantially affect the crab meat resembling texture except for exceedingly long or short lengths.

Table 2 indicates that at a jelly strength of 350 g the "Kamaboko" pieces having a resemblance to crab leg meat in appearance and texture are up to 0.5 mm×3.0 mm in cross section and 1.5 mm² in cross sectional area, which is the largest acceptable cross section. Table 4 shows that at a jelly strength of 1,500 g the corresponding largest cross section is 0.5 mm×2.5 mm, namely, 1.25 mm² in cross sectional area.

The values of the cross sectional areas which are approximately 1.4 mm² are calculated from the upper limit of the shredding width, namely, about 1.19 mm×1.19 mm (at a jelly strength of 350 g) and those having a cross sectional area of 1.16 mm² are calculated from the upper limit of the shredding width, namely, about 1.08 mm×1.08 mm (at a jelly strength of 1,500 g) which upper limit values are given by FIG. 3.

Table 5 indicates that the shredded pieces of "Kamaboko" of varying jelly strengths tested should, most preferably, have a cross sectional area of up to 1.25 mm² with one edge of the section having a length of 0.5 mm to 2.5 mm.

The jelly strengths referred to above were all measured by a jelly strength tester of the Okada type equipped with a plunger 5 mm in diameter and having a spherical end.

The meat from crab legs has a different appearance than that of crab bodies in that it is covered with a fascia which contains a chromoprotein which exhibits an attractive color on heating. The attractive appearance as well as the configuration and size of the myotomes gives an enhanced appetite, producing influence to the texture.

According to this invention, the molded mass of "Kamaboko" to be shredded is covered on the front and rear sides with a thin coating of mashed fish meat incorporating a crab-like color pigment (i.e., a carotenoid pigment or artificial coloring agent) or directly coated on the front and rear sides with a coloring solution, and the colored mass is heated to fix the color and form a coating resembling the fascia of crag legs. The taste of the product of this invention can be made to closely resemble real crab meat by incorporating in the "Kamaboko" increased quantities of monoamino acids which are abundant in Crustacea. A still closer resemblance to crab meat can be achieved with addition of a small amount of crab meat or eggs.

| Example | |
|---|---|
| Mashed meat of fish | 10.0 kg |
| Common salt | 0.25 kg |
| Starch | 0.30 kg |
| Sugar | 0.40 kg |
| Monosodium glutamate | 0.20 kg |
| Glycine | 0.04 kg |
| Alanine | 0.02 kg |

The mashed fish meat should be of good quality so as to obtain a solid mass of "Kamaboko" having a jelly strength of about 1,000 g.

A mixture of the above ingredients is placed into a mold having an interior space of 34 cm in width, 38 cm in length and 3 cm in depth. The mixture is coated on its top surface with a coloring solution resembling crab meat in color (e.g., a mixture of 8.0% of annato coloring, 0.5% of food coloring—Red No. 104 and 9.15% of propylene glycol) and is thereafter allowed to stand overnight in a constant temperature chamber at about 15° C.

Figure 5:
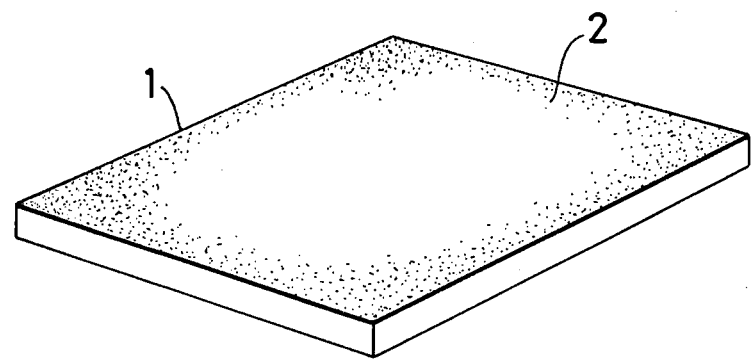
FIG. 5 is a perspective view of "Kamaboko" or a molded product of mashed fish meat in the form of a rectangular parallelepiped.
Figure 6:
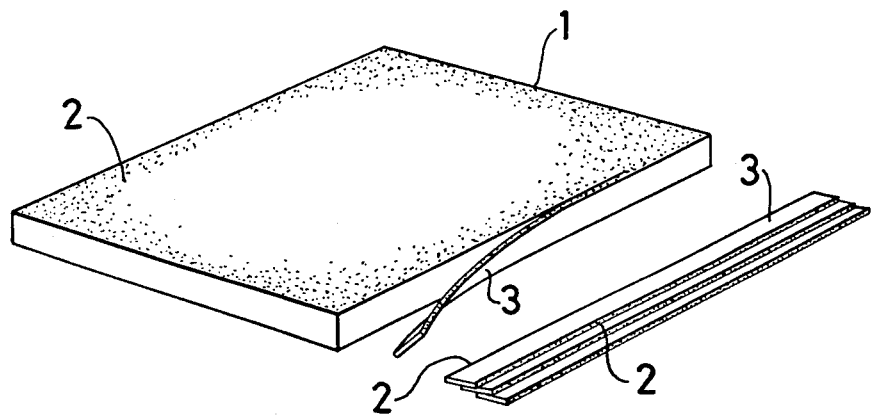
FIG. 6 is a perspective view of the "Kamaboko" of FIG. 5 as it is being shredded.
Figure 7:
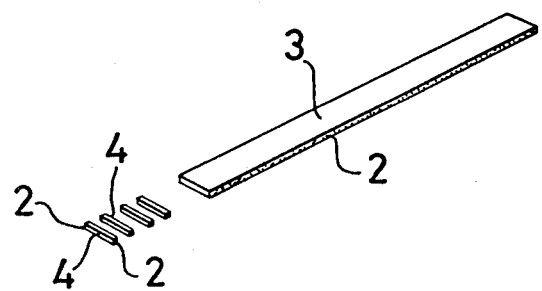
FIG. 7 is a perspective view showing a shred of the "Kamaboko" as it is being shredded further into fiber-like pieces.

Subsequently, the mass is coated with the coloring solution over the rear surface thereof and steamed at 90° to 95° C. for 40 minutes. The mass is then cooled and released from the mold, whereby a plate-like solid mass 1 ("Kamaboko") is obtained as shown in FIG. 5. The "Kamaboko" is shredded to a thickness of 1.0 mm at right angles to its front and rear surfaces to obtain shreds 3 (FIG. 6). The shreds are further shredded in the same dimension as above into fiber-like pieces 4 (FIG. 7). Indicated at 2 (FIG. 6) are color coatings formed on the front and rear surfaces of the "Kamaboko".

The fiber-like pieces thus prepared have a crab meat resembling texture.

I claim:
1. A crab meat substitute which is similar in taste and texture to crab meat comprising a fiber-like product prepared by heating mashed surimi in a mold to a gel point to form a molded fish product and shredding said molded fish product having a jelly strength from about 300 to about 1500 g. into fiber-like pieces ranging between 0.25 and 3.0 mm in width and having a cross-sectional area up to 2.25 mm².

2. A crab meat substitute as claimed in claim 1 wherein said molded product is coated with a mixture of heat fixed mashed fish meat having a dye therein to impart a color resembling crab meat.

3. A crab meat substitute as claimed in claim 1 wherein said fiber-like product includes lengths of about 3 cm to about 8 cm.

4. A method of preparing a crab meat substitute which is similar in taste and texture to crab meat comprising the steps of:
 a. mashing surimi;
 b. heating the mashed surimi in a mold for a time sufficient to solidify the mashed surimi to a solid mass having a jelly strength of from about 300 g. to about 1500 g.; and
 c. shredding the solid mass of surimi into fiber like pieces of about 0.25 to 3.0 mm in width and up to about 2.25 mm$^2$ in cross-sectional area.

5. The method as claimed in claim 4 which further comprises cutting said shredded pieces into lengths of about 3 to 8 cm.

6. The method as claimed in claim 4 including coating the surfaces of the molded mass of Surimi with a colorant in amounts sufficient to impart a crab-like color.

7. The method as claimed in claim 6 wherein said colorant is selected from the group consisting of carotenoid pigment, annato coloring and food coloring—Red No. 104.

8. The method as claimed in claim 7 wherein said artifical coloring is a mixture of 8.0% by volume of annato coloring, 0.5% by volume of food coloring—Red No. 104, and 91.5% by volume of propylene glycol.

9. The method as claimed in claim 4 including coating the surfaces of the molded mass of Surimi with a coating of mashed fish meat containing a colorant in amounts sufficient to impart a crab-like color and heat fixing said coating.

10. The method as claimed in claim 9 wherein said colorant is selected from the group consisting of carotenoid pigment, annato coloring and food coloring—Red No. 104.

11. The method of claim 4 wherein said surimi is mixed with a flavoring amount of crab meat to more closely resemble crab meat in taste.

12. The method of claim 4 wherein said surimi is mixed with a flavoring of crab eggs to more closely resemble crab meat in taste.

* * * * *